(12) United States Patent
Kuss et al.

(10) Patent No.: US 6,506,300 B2
(45) Date of Patent: Jan. 14, 2003

(54) DISTRIBUTOR PLATE FOR CROSSFLOW CASSETTE-TYPE FILTRATION APPLIANCES

(75) Inventors: Knut Kuss, Nidderau (DE); Karl-Heinz Pischke, Göttingen (DE)

(73) Assignee: Sartorius AG, Gottingen (DE)

( * ) Notice: Subject to any disclaimer, the term of this patent is extended or adjusted under 35 U.S.C. 154(b) by 24 days.

(21) Appl. No.: 09/855,788

(22) Filed: May 15, 2001

(65) Prior Publication Data

US 2002/0170854 A1 Nov. 21, 2002

(51) Int. Cl.$^7$ ................................. B01D 65/00
(52) U.S. Cl. ................. 210/224; 210/321.6; 210/323.1; 210/433.1; 137/561 A
(58) Field of Search ................. 210/224, 239, 210/240, 249, 321.6, 322, 323.1, 345, 433.1; 137/561 A

(56) References Cited

U.S. PATENT DOCUMENTS

| | | |
|---|---|---|
| 4,715,955 A | 12/1987 | Friedman |
| 4,849,102 A | 7/1989 | Latour et al. |
| 5,096,582 A * | 3/1992 | Lombardi et al. ........ 210/321.6 |

FOREIGN PATENT DOCUMENTS

| | | |
|---|---|---|
| DE | 3441249 A1 | 5/1985 |
| GB | 2 343 853 | 9/2000 |
| GB | 2 348 381 A | 10/2000 |
| WO | 0 345 209 B1 | 7/1994 |

\* cited by examiner

*Primary Examiner*—Matthew O. Savage
(74) *Attorney, Agent, or Firm*—Anthony J. Casella; Gerald E. Hespos

(57) ABSTRACT

A monodirectional or bi-directional distributor plate for crossflow cassette-type filtration appliances is provided which comprises three parts and is used in the ultrafiltration or microfiltration of liquids. The three-part distributor plate assembly comprises a middle plate member, an upper plate member and a lower plate member, which when combined has a front and rear surface, a first and second side wall and a first and second edge wall. The front and rear surfaces of the distributor plate assembly are provided with feed, residue and filtrate orifices arranged to communicate with feed, residue and filtrate orifices of a plurality of filter cassettes. Due to the manner of flow to and/or from associated filter cassettes by way of the three-part distributor plate assembly, equal pressure can be achieved at all orifices to ensure equal flow over a filter membrane surface increasing filtration performance. The three-part construction of the distributor plate allows for easy adaptability to various installations.

11 Claims, 9 Drawing Sheets

DISTRIBUTOR PLATE FOR CROSSFLOW CASSETTE-TYPE FILTRATION APPLIANCES

BACKGROUND OF THE INVENTION

1. Field of the Invention

The subject invention relates to a manifold apparatus for a plurality of liquid filtration segments wherein filtration is effected by tangential flow of the liquid across a filter surface, and more particularly, to a distributor plate for crossflow cassette-type filtration appliances which permits stacking of a plurality of filtration modules wherein liquid is introduced and removed from the filtration module under conditions to provide improved separation of filtrate species from retentate species.

2. Description of the Related Art

Crossflow cassette filtration apparatus usually consist, according to the state of the art, of a holder, filter cassettes and end plates. The holder receives the end plates and at least one filter cassette, which is sealingly pressed between the end plates. For that purpose the end plates are arranged on the holder to be movable on one another. At least one end plate is constructed as a distributor plate with connections for the feed of liquid, which is to be filtered, into the filter cassettes and for the discharge of concentrate and filtrate from the filter cassettes. If the feed and/or discharge of the fluids takes place merely at one surface of the distributor plate, the plate is termed a monodirectional distributor plate and if the feed and/or discharge of the fluids takes place at the front and back surface of the distributor plate, it is termed a bi-directional distributor plate. In the latter case, the filter cassettes are arranged at both ends at the front and back surface of the distributor plate.

In DE-OS 34 41 249, there is described a crossflow cassette filtration device in which the filter cassettes are clamped between two end plates respectively constructed as distributor plates. It is disadvantageous that the connections at the two distributor plates cannot be fixedly piped in, because the distributor plates have to be moved on one another for the clamping of the filter cassettes in place. Fixed piping would, however, significantly increase the filtration reliability, inclusive of the capability of the device to be sterilized, which is particularly important in sensitive areas of filtration, for example, the pharmaceutical or biotechnological field.

U.S. Pat. No. 4,715,955 describes a crossflow cassette filtration apparatus consisting of holder, filter cassette and end plates, wherein one of the end plates is constructed as a monodirectional distributor plate at which are arranged all the connections for the feed and discharge of the fluids. A design of this distributor plate as a bi-directional distributor plate is discussed in EP 0 345 209 B1, or its equivalent U.S. Pat. No. 4,849,102. In both cases, the distributor plates have opposite planar front and back surfaces, opposite narrow first and second side walls, opposite narrow first and second edge walls, a respective connection for the feed of liquid to be filtered and for the discharge of concentrate and two connections for the discharge of filtrate. The front surface or the front and back surfaces have mutually spaced openings which agree with corresponding openings of the filter cassettes to be connected to the distributor plate. The openings for the feed of liquid to be filtered and a first number of openings for the discharge of filtrate lie on a straight line parallel to the first narrow edge wall, and the openings for the discharge of concentrate and a second number of openings for the discharge of filtrate lie on a straight line parallel to the second narrow edge wall. The first number of openings for the discharge of filtrate open at an acute angle with respect to the front surface or the front and back surfaces into a first channel, which extends parallel to the first narrow edge wall and to the front and back surfaces. It exits from the distributor plate at at least one of the side walls. The second number of openings for the discharge of filtrate open at an acute angle with respect to the front surface or front and back surfaces into a second channel, which extends parallel to the second narrow edge wall and to the front and back surfaces. It exits from the distributor plate at at least one of the side walls.

It is disadvantageous that the connection for the feed of liquid to be filtered and the connection for the discharge of concentrate are effected at, respectively, the end of the first channel and the end of the second channel from one of the side walls. This configuration leads to an undesired pressure decay in the direction of the end, which is opposite to the connection, of the channels, which continues on over the membrane surfaces. This pressure gradient leads to a non-uniform flowing over and through the membrane surfaces and thus to a non-uniform utilization of the membrane surfaces of the filter cassette, which has as a consequence a reduction in the filtration performance and a premature blocking of the membranes in the more strongly loaded regions.

Thus, there is a need for a distributor plate for cassette filtration apparatus which may enable an improved filtration performance and a longer service life of the cassette filtration apparatus.

Additionally, the distributor plates of the prior art are made of a unitary construction with standard pipeline connections. However, throughout the world, there are different pipeline standards which all differ in terms of diameter and wall thickness. By the way of an example, a pipeline of nominal width DN25 may have the following internal diameter: ISO standard –30.5 mm; DIN standard 11851 –25 mm; SMS standard –22.5 mm; and BSOD standard (inches) –22.1 mm. Since the holders of filtration apparatus are usually integrated into existing surroundings, the pipeline standard which is customarily employed by a user must be used. Furthermore, for the design of an overall installation to comply with good manufacturing practices, it is absolutely imperative to ensure a transition which is in no way mismatched.

Typical filtration apparatus employ connections which only correspond to one standard and have to be reduced accordingly in any given installation. Adapting of the holders and/or distribution plates is only possible with a considerable structural outlay because of the offset bores of varying manufacturers since it is usually necessary to change the angle of the bores.

Therefore, there is a further need for a distributor plate for cassette filtration apparatus which are easily adaptable for varying pipeline standards and varying installation configurations.

SUMMARY OF THE INVENTION

In accordance with the present invention, a distributor plate assembly for crossflow cassette-type filtration appliances is provided which consists of three parts and is used in the ultrafiltration or microfiltration of liquids. The three-part distributor plate assembly comprises a middle plate member, an upper plate member and a lower plate member, which when combined in use has a front surface and rear surface, a first and second side wall and a first and second edge wall.

The middle plate member receives a feed duct and a residue duct which run parallel to the edge walls and to the front surface and rear surface and emerge at least from one of the side walls. The feed duct is connected via feed connecting ducts to feed orifices on the front surface and/or rear surface of the middle plate. The feed orifices are arranged congruently to corresponding feed orifices of a filtration module. The residue duct is connected via residue connecting ducts to residue orifices on the front surface and/or rear surface of the middle plate. The residue orifices are arranged congruently to corresponding residue orifices of a filtration module.

Furthermore, the middle plate member includes on its front and/or rear surface upper and lower filtrate orifices which are arranged congruently to corresponding filtrate orifices of the filtration module. The upper filtrate orifices are connected in a communicating manner to an upper filtrate collecting chamber via upper filtrate connecting ducts. In the first embodiment of the three-part distributor plate, the filtrate collecting chamber is designed as a depression in the first edge wall of the middle plate member. In the second embodiment, the filtrate collecting chamber is designed as a depression in the edge wall of the upper plate member, which faces the first side wall of the middle plate member. The lower filtrate orifices are connected in a communicating manner to a lower filtrate collecting chamber via lower filtrate connecting ducts similar to the manner for the upper filtrate orifices.

The different embodiments of the three-part distributor plate assembly of the subject invention varies by the configuration of the upper and lower plate members, which allows the distributor plate assembly to be adapted to different installations without redesigning the distributor plate. In the first embodiment, the upper plate member receives a filtrate duct which runs parallel to the edge walls and to the front and rear surface and emerges at least from one of the side walls. The filtrate duct is connected in a communicating manner to the upper filtrate collecting chamber of the middle plate member via one or more longitudinal filtrate duct orifices. Similar to the upper plate member, the lower plate member receives a filtrate duct which runs parallel to the edge walls and to the front and rear surfaces and emerges from at least one of the side walls. The filtrate duct is connected in a communicating manner to the lower filtrate collecting chamber of the middle plate member via one or more longitudinal filtrate duct orifices.

In the second embodiment, the upper plate member receives a short filtrate duct which runs perpendicular to the edge walls and at right angles to the front and rear surface and emerges from the edge wall of the upper plate member. The filtrate duct is connected in a communicating manner directly to the upper filtrate collecting chamber of the upper plate member. Similar to the upper plate member, the lower plate member receives a filtrate duct which runs perpendicular to the edge walls and at right angles to the front and rear surfaces and emerges from the edge wall of the lower plate member. The filtrate duct is connected in a communicating manner directly to the lower filtrate collecting chamber of the lower plate member.

Finally, in either embodiment, the upper and lower plate members are connected to the middle plate member via connections, for example screws, familiar to a person skilled in the art. Additionally, a fluidtight seal is implemented in the peripheral edge region of the filtrate collecting chambers, for example, by means of an O-ring seal.

Due to the manner of flow to and/or from associated filter cassettes or modules by way of a distributor plate assembly embodying the invention, it may be possible to achieve approximately the same pressure at all channels, which communicate with the said openings, of the filter cassettes. Thus, an equal flowing over the membrane surfaces in terms of area and an equal flowing through the membranes in the filter cassettes may be ensured, which may produce an increase in the filtration performance by up to 15% and an approximately equivalent extension of the service life of a cassette filtration apparatus equipped with such a distributor plate assembly.

Furthermore, the three-part construction allows the distributor plate assembly to be adapted for various installations. By having the ability to change the diameter of the ducts in the end plate member, the other bores of the plate remain unchanged and the distributor plate assembly does not have to be redesigned. Additionally, the distributor plate member can be custom made to the user's existing installation without external adaptors resulting in reduced dead space and a more compact overall design.

These and other features of the present invention will become apparent from the following detailed description considered in connection with the accompanying drawings. It should be understood, however, that the drawings are designed for the purpose of illustration only and not as a definition of the limits of the invention.

BRIEF DESCRIPTION OF THE DRAWINGS

FIG. 9 is a diagrammatic perspective illustration of the middle plate member of the distributor plate assembly shown in FIG. 6a.

DETAILED DESCRIPTION OF THE PREFERRED EMBODIMENTS

Figure 1:
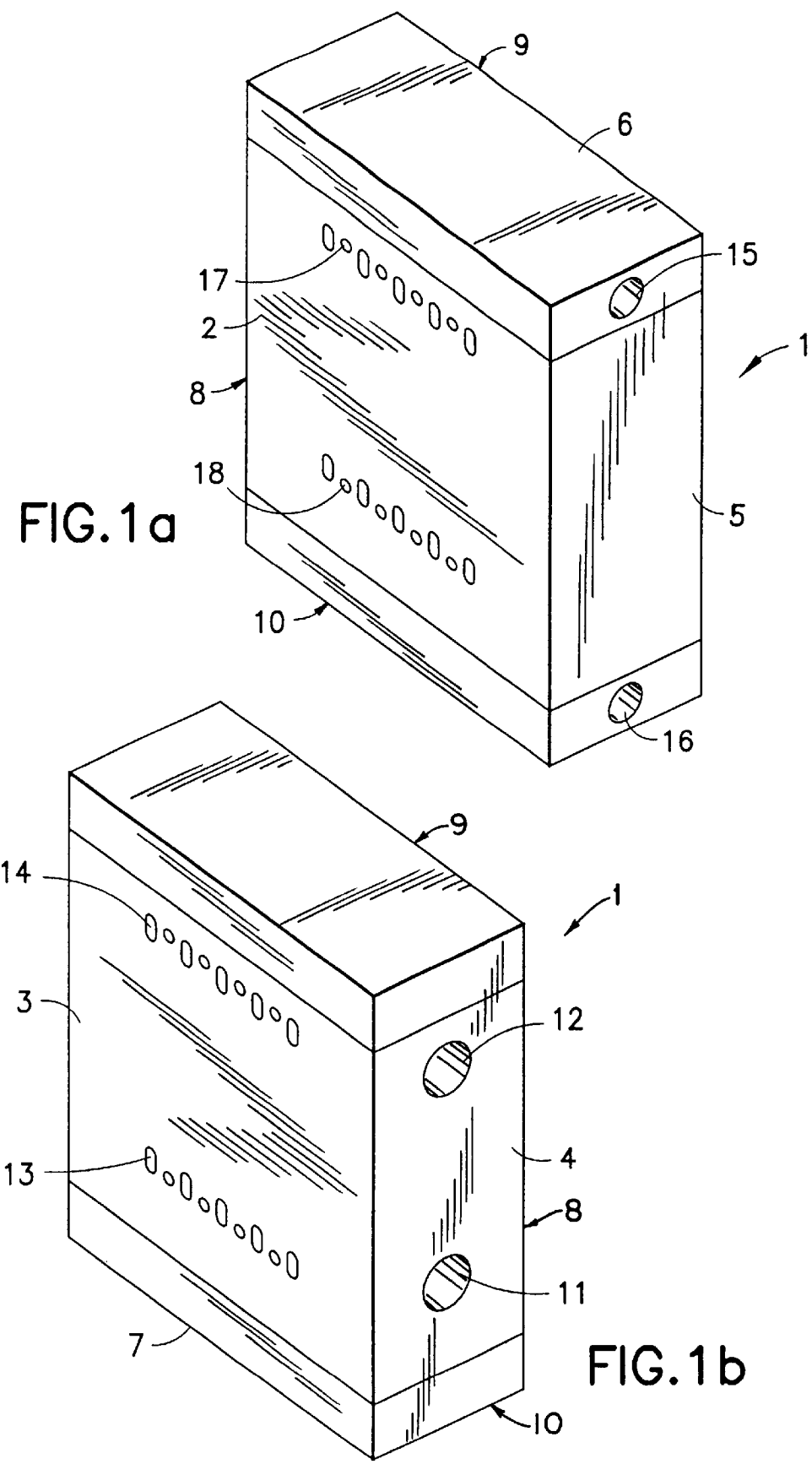
FIG. 1a is a perspective illustration of a distributor plate assembly in accordance with the subject invention.
FIG. 1b is a perspective illustration of the distributor plate assembly shown in FIG. 1a rotated through 180°.

The distributor plate assembly for crossflow cassette-type filtration appliances of the subject application comprises three parts and is used in the ultrafiltration or microfiltration of liquids. The three-part distributor plate assembly can be used as a monodirectional distributor plate, where the feed and/or discharge of fluids takes place on only one surface of the plate, or as a bi-directional distributor plate, where the feed and/or discharge of fluids takes place on the front and rear surface of the plate. The embodiments described below will be described in reference to a bi-directional distributor plate where like reference numerals represent like elements.

Referring to FIGS. 1 through 5, the first embodiment of the three-part distributor plate assembly 1 comprises a middle plate member 8, an upper plate member 9 and a lower plate member 10 and has a front surface 2 and rear surface 3, a first 4 and a second 5 side wall and a first 6 and second 7 edge wall.

Figure 5:
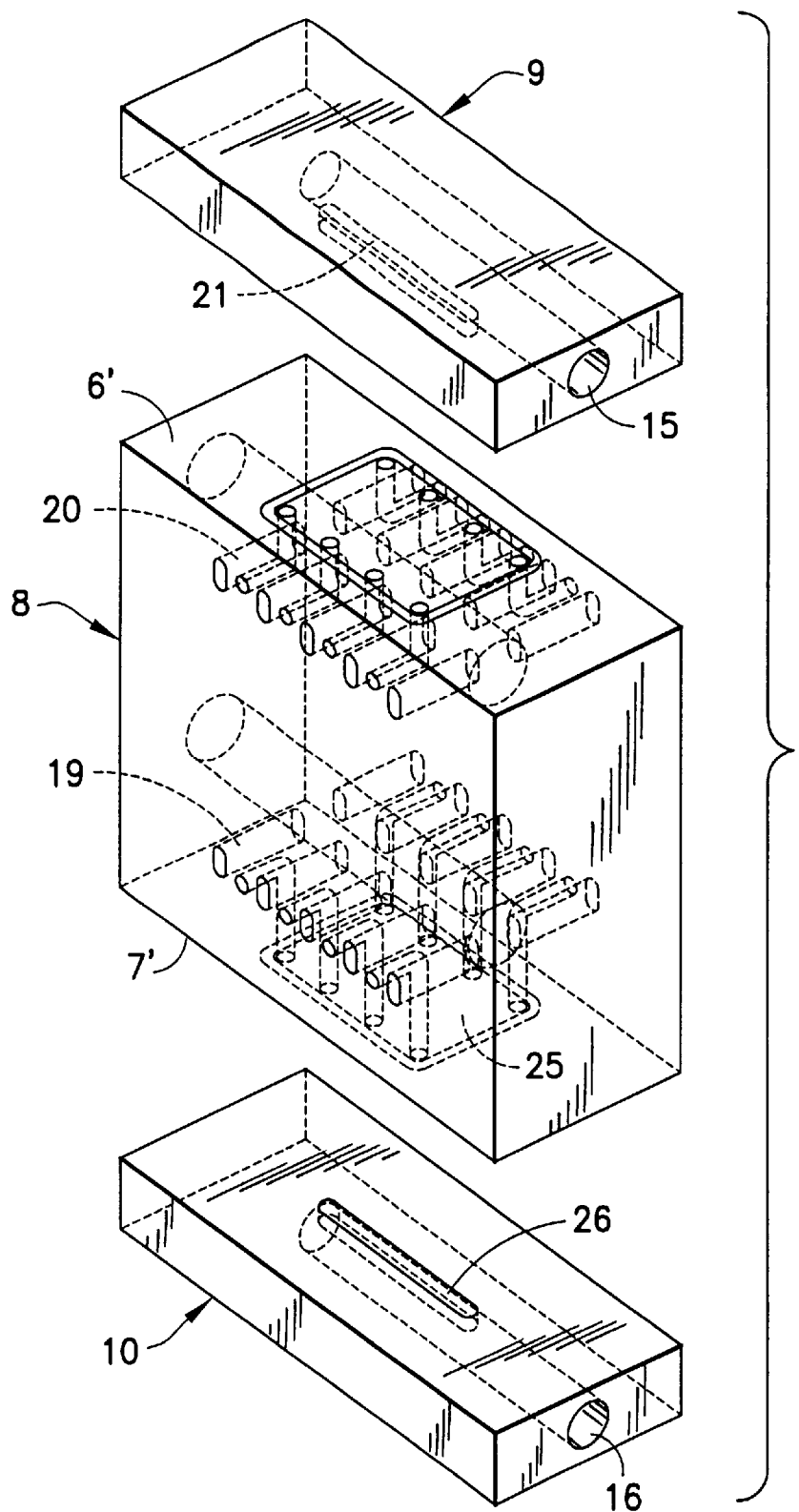
FIG. 5 is an exploded perspective illustration of the distributor plate assembly shown in FIG. 1 with certain internal structure thereof shown in phantom.
Figure 6:
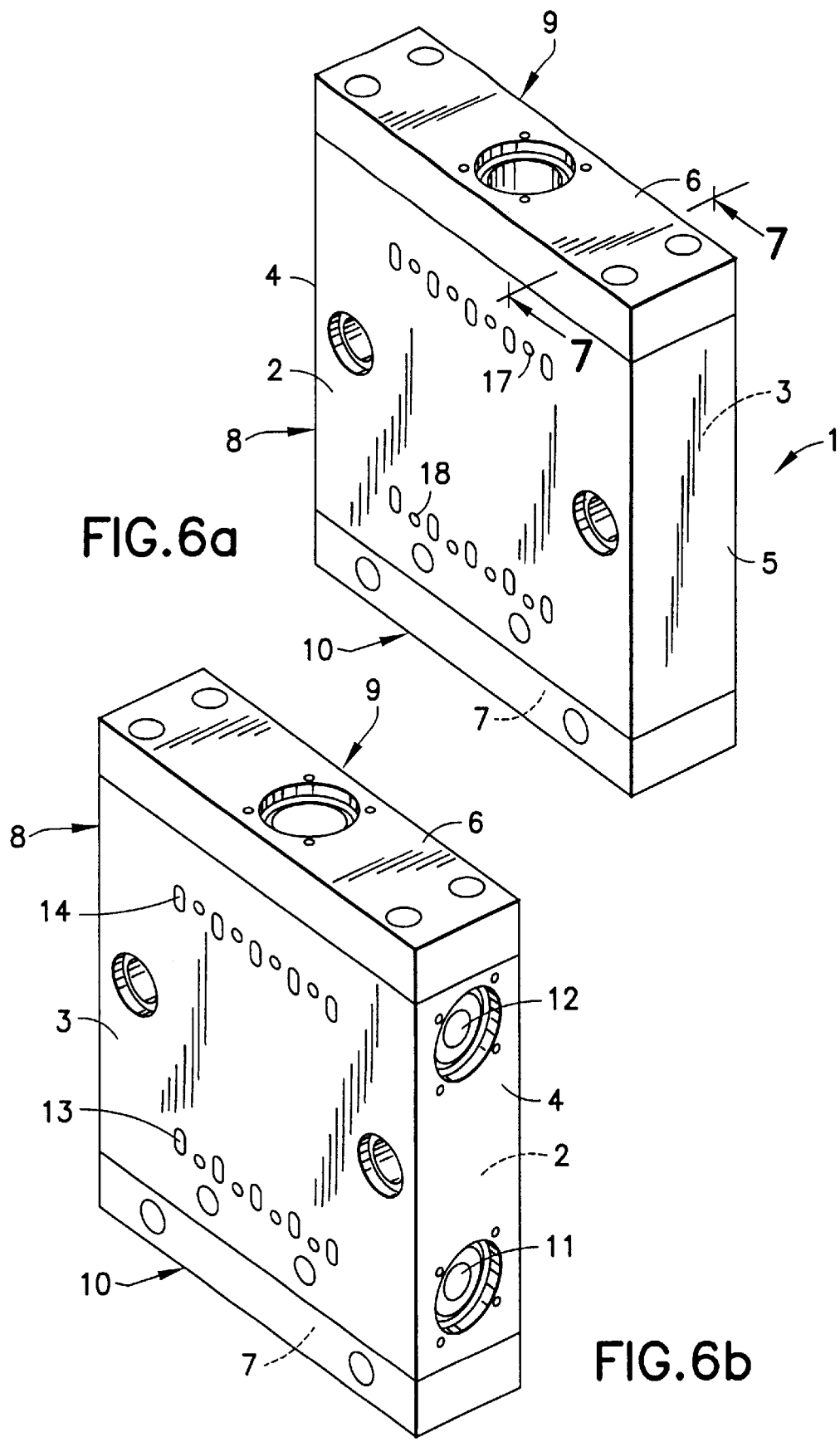
FIG. 6a is a perspective illustration of a distributor plate assembly in accordance with the subject invention.
FIG. 6b is a perspective illustration of the distributor plate assembly shown in FIG. 6a rotated through 180°.
Figure 7:
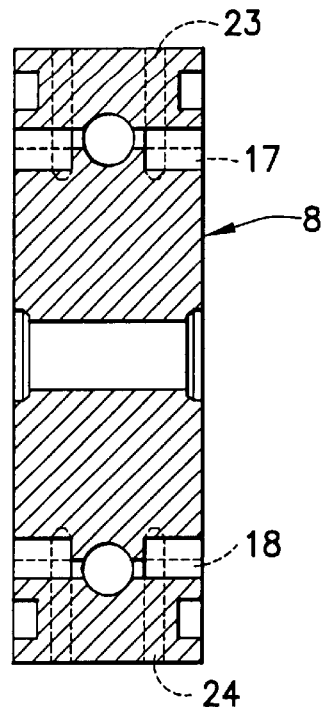
FIG. 7 is a cross-sectional view of the middle plate member of the distributor plate assembly shown in FIG. 6a taken along lines 7—7.
Figure 8:
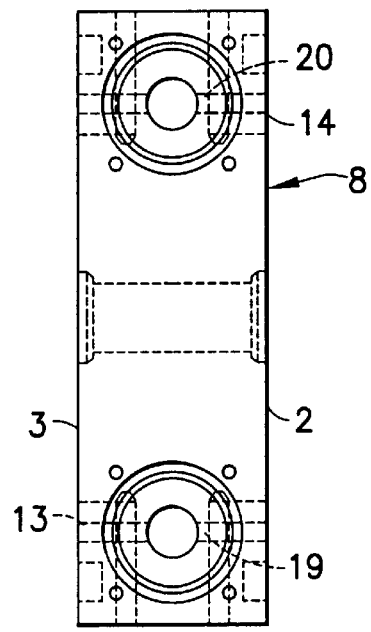
FIG. 8 is a plan view of a first side wall of the middle plate member of the distributor plate assembly of FIG. 6b with certain internal structure thereof shown in phantom.
Figure 9:
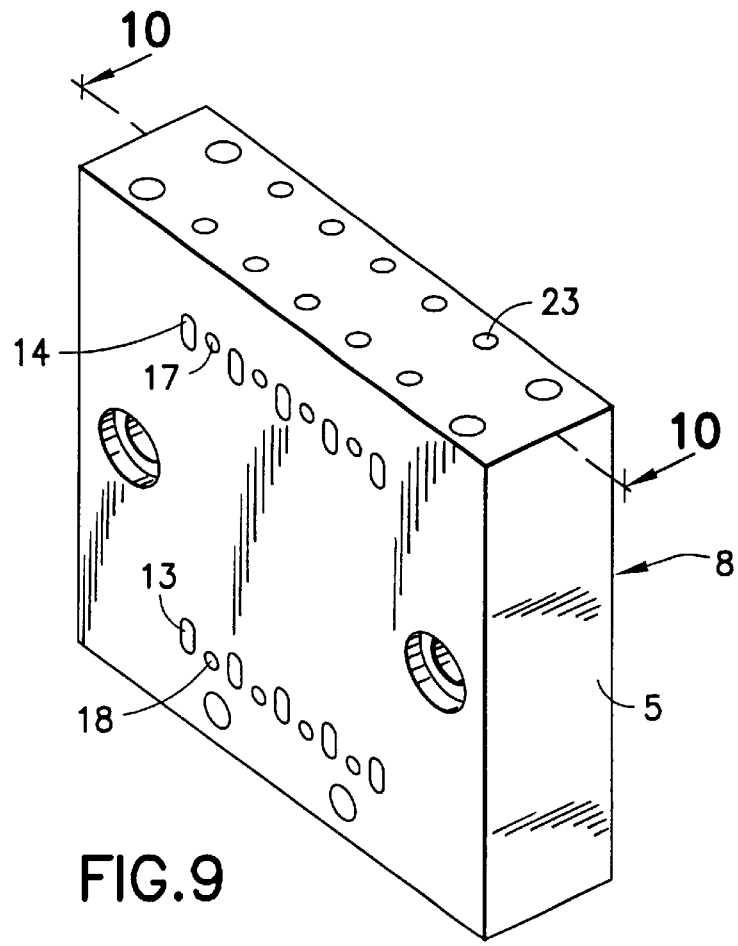
Figure 10:
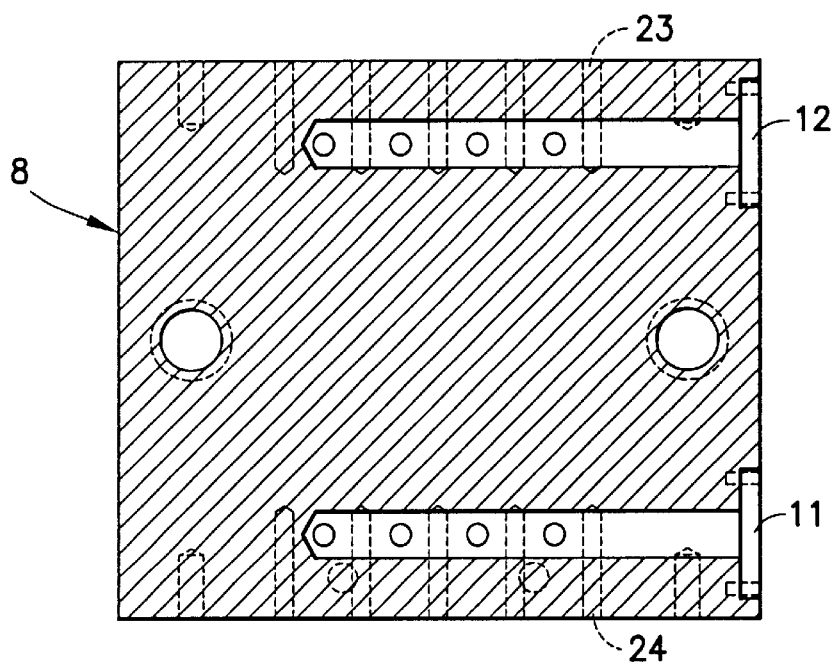
FIG. 10 is a longitudinal-section view of the middle plate member of the distributor plate assembly shown in FIG. 9 taken along lines 10—10.
Figure 11:
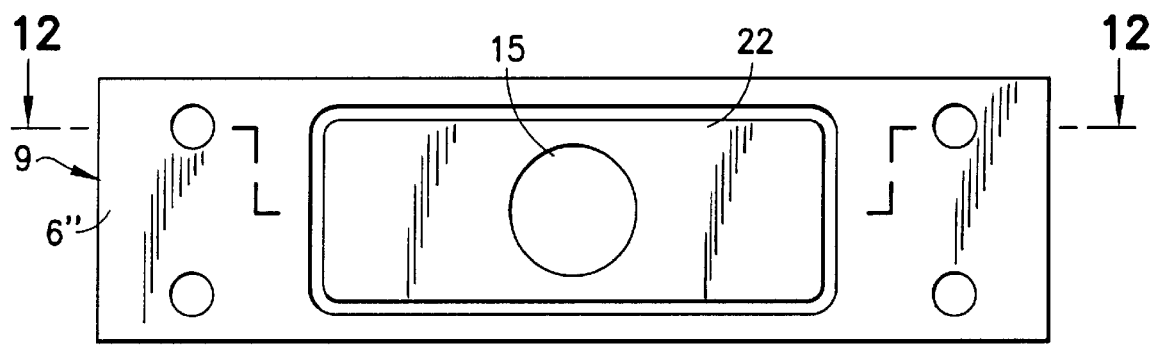
FIG. 11 is a bottom plan view of the upper plate member of the distributor plate assembly shown in FIG. 6a, where the bottom surface of the upper plate member rests on the middle plate.
Figure 12:
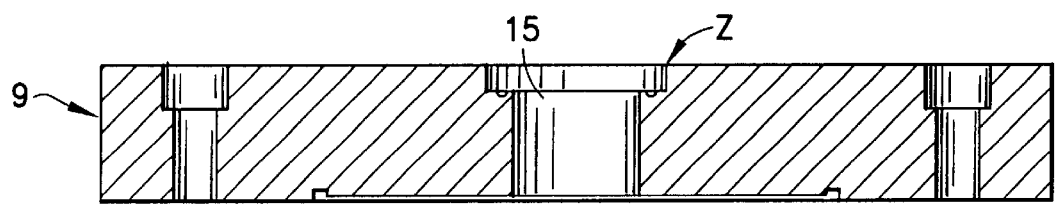
FIG. 12 is a cross-sectional view of the upper plate member of FIG. 11 taken along lines 12—12.
Figure 13:
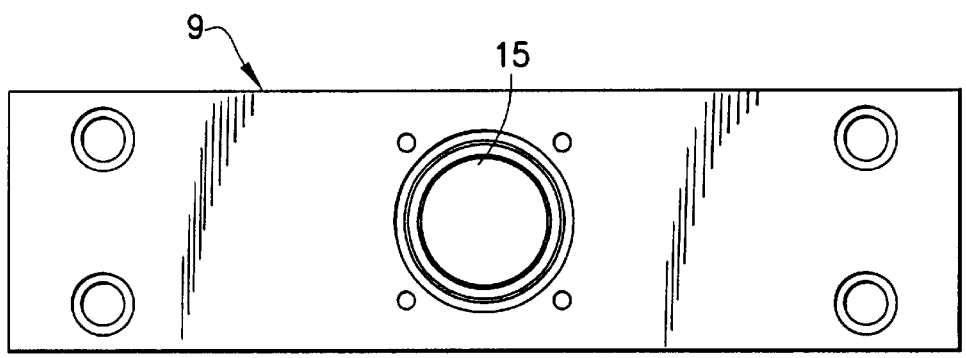
FIG. 13 is a top plan view of the upper plate member of FIG. 11.

The middle plate member 8 receives a feed duct 11 and a residue duct 12 which run parallel to the edge walls 6, 7 and to the front surface 2 and rear surface 3 and emerge at least from one of the side walls 4 as shown in FIG. 1b. The feed duct 11 is connected via feed connecting ducts 19 to feed orifices 13 on the front surface 2 and rear surface 3 of the middle plate member 8, as shown in FIG. 5. The feed orifices 13 are arranged congruently to corresponding feed orifices of filtration modules (not shown). The residue duct 12 is connected via residue connecting ducts 20 to residue orifices 14 on the front surface 2 and rear surface 3 of the middle plate member 8 (FIG. 5). The residue orifices 14 are arranged congruently to corresponding residue orifices of the filtration modules (not shown).

Figure 2:
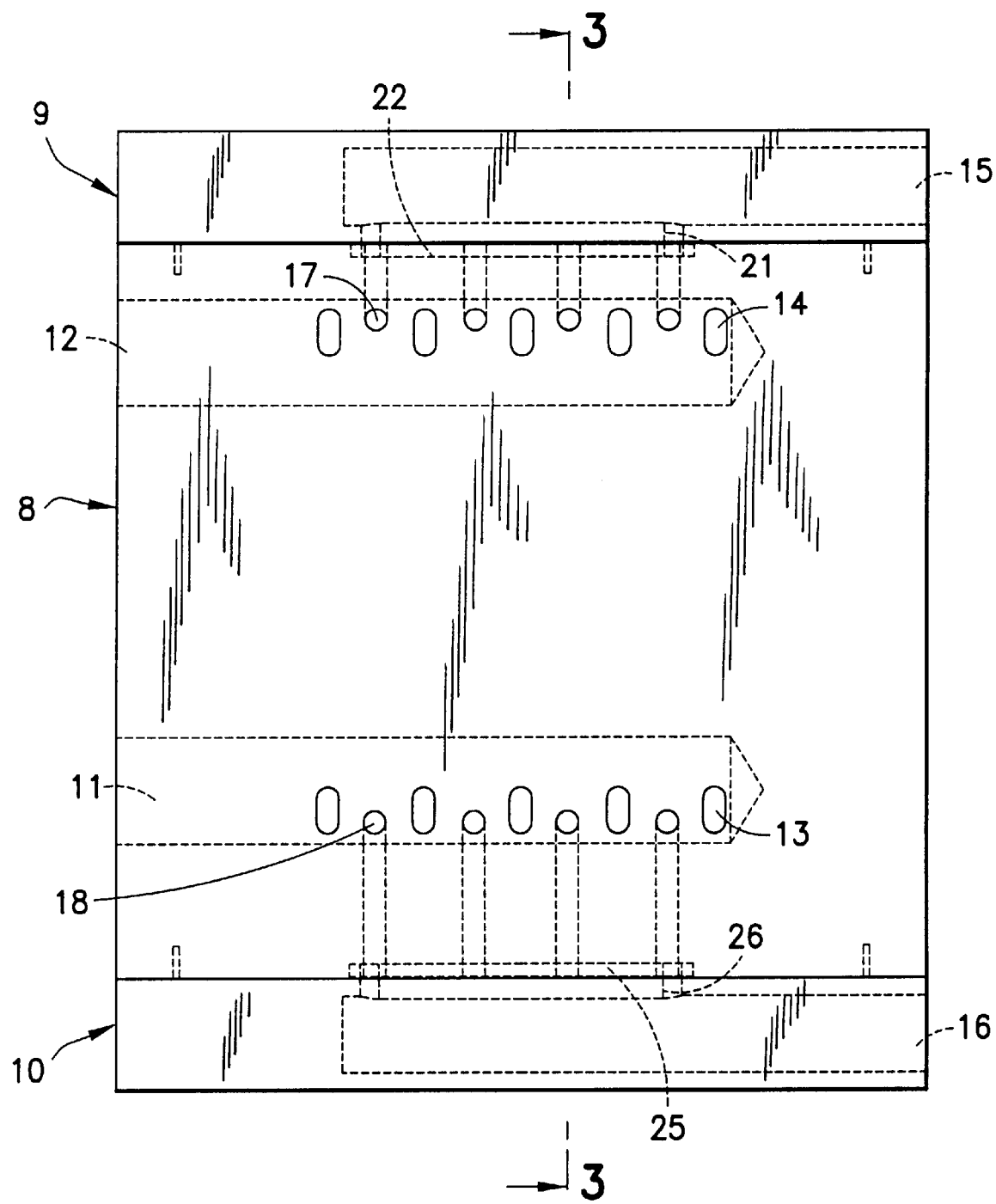
FIG. 2 is a side elevational view of the distributor plate assembly of FIG. 1.
Figure 3:
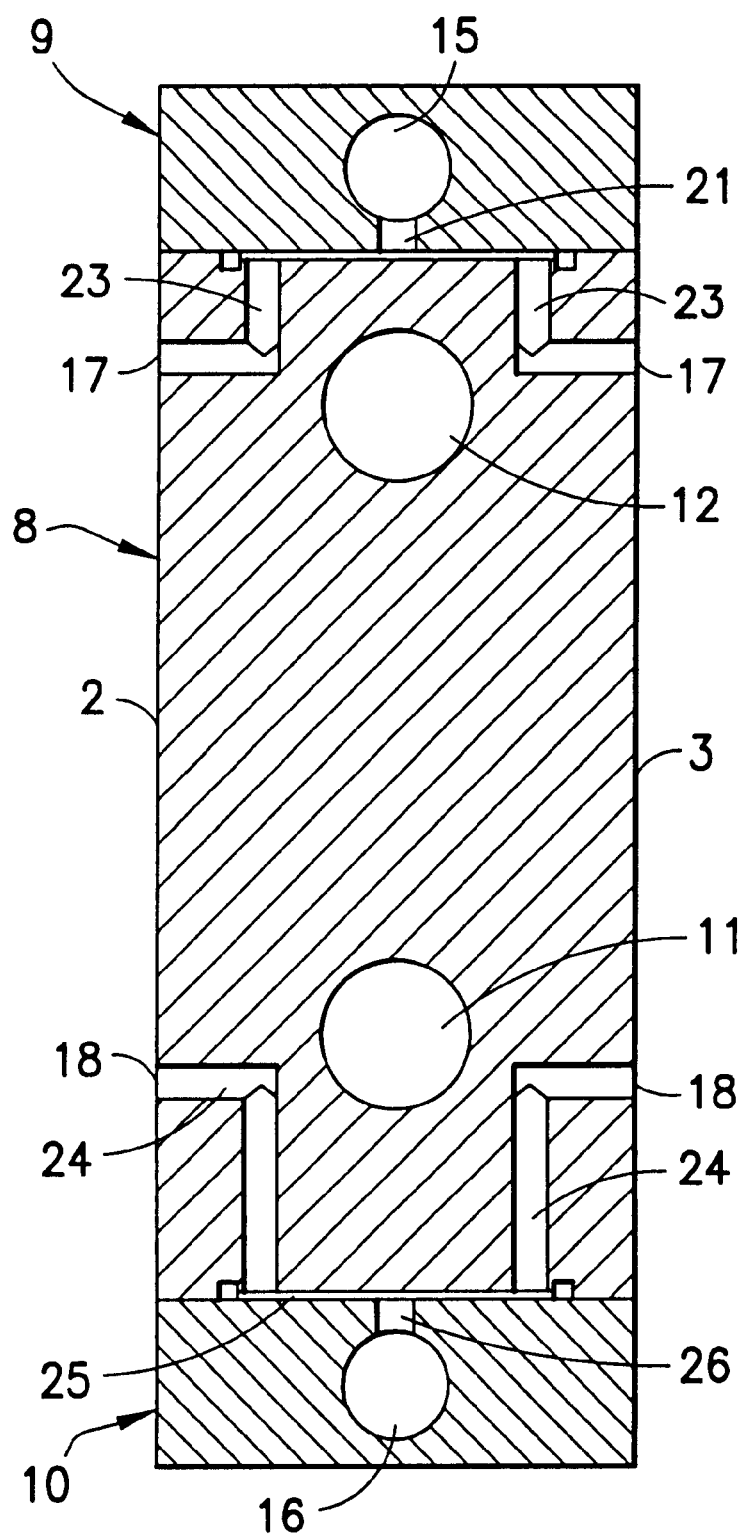
FIG. 3 is a cross-sectional view of the distributor plate assembly taken along lines 3—3 in FIG. 2.
Figure 4:
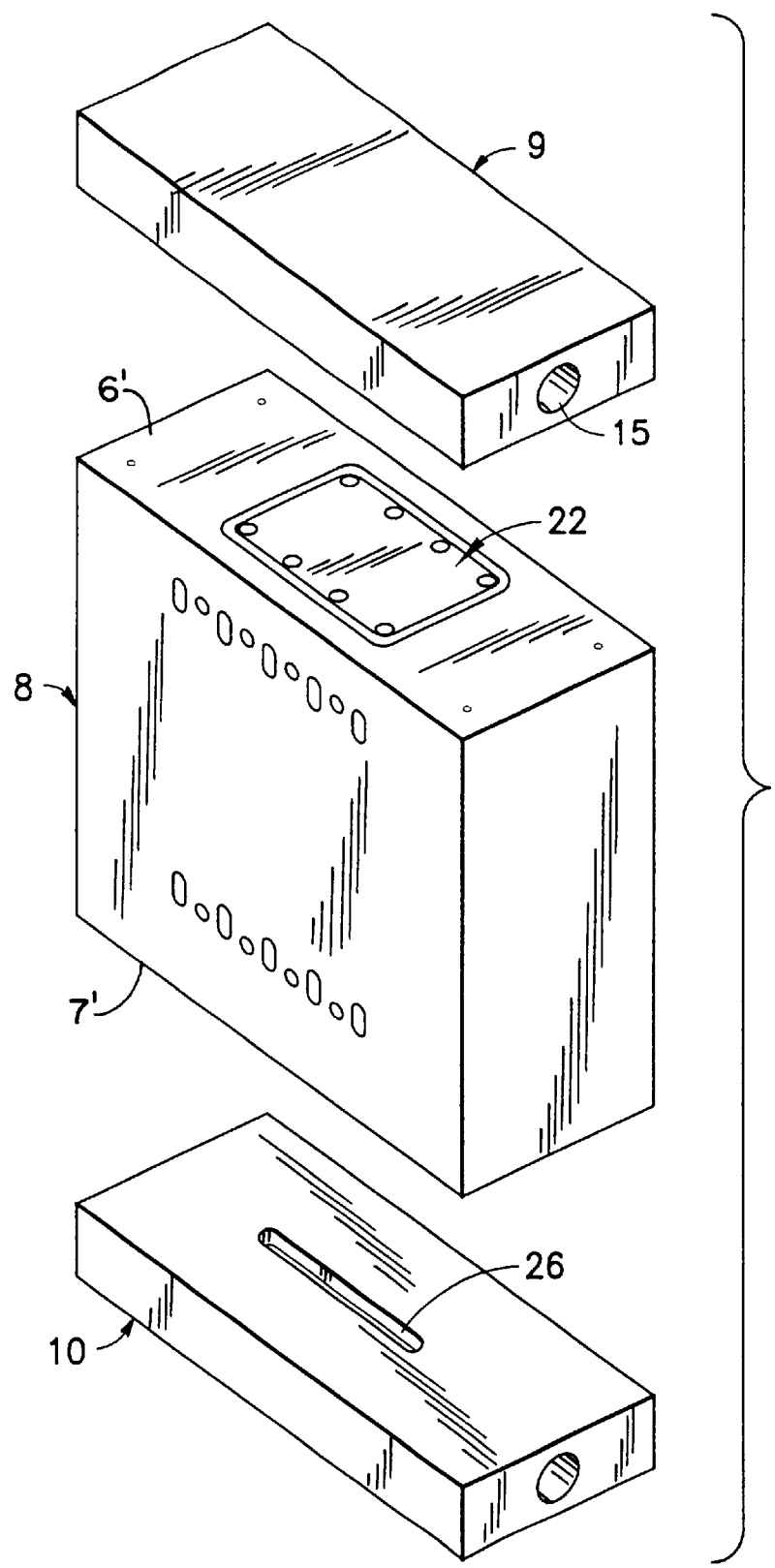
FIG. 4 is an exploded perspective illustration of the distributor plate assembly shown in FIG. 1.

Furthermore, the middle plate member 8 has on its front surface 2 and rear surface 3 upper 17 and lower 18 filtrate orifices which are arranged congruently to corresponding filtrate orifices of the filtration modules (not illustrated). As best shown in FIGS. 2 and 3, the upper filtrate orifices 17 are connected in a communicating manner to an upper filtrate collecting chamber 22 via upper filtrate connecting ducts 23. The filtrate collecting chamber 22 is designed as a depression in the first edge wall 6' of the middle plate member 8. Similarly, the lower filtrate orifices 18 are connected in a communicating manner to a lower filtrate collecting chamber 25 via lower filtrate connecting ducts 24. The filtrate collecting chamber 25 is designed as a depression in the second edge wall 7' of the middle plate 8 member.

The upper plate member 9 receives a filtrate duct 15 which runs parallel to the edge wall 6 and to the front surface 2 and rear surface 3 and emerges at least front one of the side walls 5 as shown in FIG. 1a. The filtrate duct 15 is connected in a communicating manner to the upper filtrate collecting chamber 22 of the middle plate member 8 via one or more longitudinal filtrate duct orifices 21. Similarly, the lower plate member 10 receives a filtrate duct 16 which runs parallel to the edge wall 7 and to the front surface 2 and rear surface 3 and emerges at least from one of the side walls, here 5. The filtrate duct 16 is connected in a communicating manner to the lower filtrate collecting chamber 25 of the middle plate 8 via one or more longitudinal filtrate duct orifices 26.

The upper 9 and lower 10 plate member are then connected to the middle plate member 8 via connection means, for example, screws or any other known connections means familiar to a person skilled in the art. A fluidtight seal is implemented in the peripheral edge region of the filtrate collecting chambers 22, 25 by means of an O-ring seal.

Referring to FIGS. 6a through 13, the second embodiment of the three-part distributor plate assembly 1 also comprises a middle plate member 8, an upper plate member 9 and a lower plate member 10 and has a front surface 2 and rear surface 3, a first 4 and a second 5 side wall and a first 6 and a second 7 edge wall.

The middle plate member 8 receives a feed duct 11 and a residue duct 12 which run parallel to the edge walls 6, 7 and to the front surface 2 and rear surface 3 and emerge at least from one of the side walls, here 4. The feed duct 11 is connected via feed connecting ducts 19 to feed orifices 13 on the front surface 2 and rear surface 3 of the middle plate member 8. The feed orifices 13 are arranged congruently to corresponding feed orifices of the filtration modules (not illustrated). The residue duct 12 is connected via residue connecting ducts 20 to residue orifices 14 on the front surface 2 and rear surface 3 of the middle plate member 8. The residue orifices 14 are arranged congruently to corresponding residue orifices of the filtration modules (not illustrated).

The middle plate member 8 of the second embodiment of the distributor plate assembly has on its front surface 2 and rear surface 3 upper 17 and lower 18 filtrate orifices which are arranged congruently to corresponding filtrate orifices of the filtration modules (not illustrated). The upper filtrate orifices 17 are connected in a communicating manner to an upper filtrate collecting chamber 22 via upper filtrate connecting ducts 23. The filtrate collecting chamber 22 is designed as a depression in the edge wall 6" of the upper plate member 9, which faces the side wall 6' of the middle plate member 8. The lower filtrate orifices 18 are connected in a communicating manner to a lower filtrate collecting chamber 25 via lower filtrate connecting ducts 24. Similarly to the upper plate member of the second embodiment, the filtrate collecting chamber 25 is designed as a depression in the edge wall of the lower plate member 10, which faces the second edge wall 7' of the middle plate member 8.

The upper plate member 9 receives a short filtrate duct 15 which runs perpendicular to the edge wall 6' and at right angles to the front surface 2 and rear surface 3 and emerges from the edge wall 6" of the upper plate member. The filtrate duct 15 is connected in a communicating manner directly to the upper filtrate collecting chamber 22 of the upper plate member 9. Similarly, the lower plate member 10 receives a filtrate duct 16 which runs perpendicular to the edge wall 7 and at right angles to the front surface 2 and rear surface 3 and emerges from the edge wall of the lower plate member 10. The filtrate duct 16 is connected in a communicating manner directly to the lower filtrate collecting chamber 25 of the lower plate member 10.

The upper 9 and lower 10 plate members are then connected to the middle plate member 8 via connection means, for example, screws or any other known connections means familiar to a person skilled in the art. A fluidtight seal is implemented in the peripheral edge region of the filtrate collecting chambers 22, 25 by means of an O-ring seal.

During crossflow filtration, the liquid to be filtered is introduced under pressure into the feed duct 11 of the distributor plate assembly 1. It flows through the feed connecting ducts 19 and enters the corresponding feed orifices of the crossflow filter cartridges (not illustrated) via the feed orifices 13 on the front 2 and rear sides 3 of the middle plate member 8, flows over the filter means (filter membranes) of the cartridges, enters the distributor plate assembly 1 again, via the residue orifices 14, and is led out of the middle plate member 8 via the residue connecting ducts 20 and the residue duct 12. The filtrate passing through the filter means of the filter cartridges is conducted, via the upper 17 and lower 18 filtrate orifices and the upper 23 and lower 24 filtrate connecting ducts, into the upper 22 and lower 25 filtrate collecting chambers, from where the filtrate is extracted from the distributor plate via the upper 15 and lower 16 filtrate ducts.

While the invention has been described with respect to preferred embodiments, it is apparent that various changes can be made without departing from the scope of the invention as defined by the appended claims.

What is claimed is:

1. A distributor plate assembly for crossflow cassette filtration appliances, said distributor plate assembly being generally rectangular to receive at least one filtration module, said distributor plate assembly comprising:
    a middle plate member having a front and rear surface, a first and second side wall and a first and second edge wall;
    a feed duct extending from said first side wall through said middle plate member for introducing a fluid into said distributor plate assembly;
    a plurality of feed orifices located on said front surface of said middle plate member, said feed orifices being in fluid communication with said feed duct via a plurality of feed connecting ducts;
    a residue duct extending from said first side wall through said middle plate member for discharging a residue fluid from said distributor plate assembly;
    a plurality of residue orifices located on said front surface of said middle plate member, said residue orifices being in fluid communication with said residue duct via a plurality of residue connecting ducts;
    a plurality of upper filtrate orifices arranged on the front surface of said middle plate member parallel to said first edge wall, said upper filtrate orifices being in fluid communication with upper filtrate connecting ducts;
    a plurality of lower filtrate orifices arranged on the front surface of said middle plate member parallel to said second edge wall, said lower filtrate orifices being in fluid communication with lower filtrate connecting ducts;
    an upper plate member having a front and rear surface, a first and second side wall and a first and second edge wall, said first edge wall of said upper plate member being located adjacent to said first edge wall of said middle plate member;
    an upper filtrate duct extending from said first or second side wall of said upper plate member being in fluid communication with an upper longitudinal filtrate duct orifice;
    an upper filtrate collecting chamber disposed between said middle plate member and said upper plate member, said upper filtrate collecting chamber being in fluid communication with said upper connecting filtrate ducts and said upper longitudinal filtrate duct orifice to allow a filtrate to pass from said filtration module through said distributor plate assembly;
    a lower plate member having a front and rear surface, a first and second side wall and a first and second edge wall, said first edge wall of said lower plate member being located adjacent to said second edge wall of said middle plate member;
    a lower filtrate duct extending from said first or second side wall of said lower plate member being in fluid communication with a lower longitudinal filtrate duct orifice; and
    a lower filtrate collecting chamber disposed between said middle plate member and said lower plate member, said lower filtrate collecting chamber being in fluid communication with said lower connecting filtrate ducts and said lower longitudinal filtrate duct orifice to allow a filtrate to pass from said filtration module through said distributor plate assembly.

2. A distributor plate assembly as in claim 1, wherein said upper filtrate duct being aligned parallel to said front and rear surfaces of said upper plate member.

3. A distributor plate assembly as in claim 2, wherein said lower filtrate duct being aligned parallel to said front and rear surfaces of said lower plate member.

4. A distributor plate assembly as in claim 3, wherein said upper filtrate collecting chamber being a depression in said first edge wall of said middle plate member.

5. A distributor plate assembly as in claim 4, wherein said lower filtrate collecting chamber being a depression in said second edge wall of said middle plate member.

6. A distributor plate assembly as in claim 5, further comprising
    a second plurality of feed orifices located on said rear surface of said middle plate member, said second of feed orifices being in fluid communication with said feed duct via a second plurality of feed connecting ducts;
    a second plurality of residue orifices located on said rear surface of said middle plate member, said second plurality of residue orifices being in fluid communication with said residue duct via a second plurality of residue connecting ducts;
    a second plurality of upper filtrate orifices arranged on the rear surface of said middle plate member parallel to said first edge wall, said second plurality of upper filtrate orifices being in fluid communication with upper filtrate connecting ducts; and
    a second plurality of lower filtrate orifices arranged on the rear surface of said middle plate member parallel to said second edge wall, said lower filtrate orifices being in fluid communication with lower filtrate connecting ducts whereby said distributor plate assembly can receive said filtration modules on said front and rear surfaces to increase filtering capacity.

7. A distributor plate assembly as in claim 1, wherein said upper filtrate duct being aligned perpendicular to said first and second edge walls of said upper plate member.

8. A distributor plate assembly as in claim 7, wherein said lower filtrate duct being aligned perpendicular to said first and second edges walls of said lower plate member.

9. A distributor plate assembly as in claim 8, wherein said upper filtrate collecting chamber being a depression in said second edge wall of said upper plate member.

10. A distributor plate assembly as in claim 9, wherein said lower filtrate collecting chamber being a depression in said second edge wall of said lower plate member.

11. A distributor plate assembly as in claim 10, further comprising
    a second plurality of feed orifices located on said rear surface of said middle plate member, said second of feed orifices being in fluid communication with said feed duct via a second plurality of feed connecting ducts;
    a second plurality of residue orifices located on said rear surface of said middle plate member, said second plurality of residue orifices being in fluid communication with said residue duct via a second plurality of residue connecting ducts;

a second plurality of upper filtrate orifices arranged on the rear surface of said middle plate member parallel to said first edge wall, said second plurality of upper filtrate orifices being in fluid communication with upper filtrate connecting ducts; and a second plurality of lower filtrate orifices arranged on the rear surface of said middle plate member parallel to said second edge wall, said lower filtrate orifices being in fluid communication with lower filtrate connecting ducts whereby said distributor plate assembly can receive said filtration modules on said front and rear surfaces to increase filtering capacity.

* * * * *

UNITED STATES PATENT AND TRADEMARK OFFICE
CERTIFICATE OF CORRECTION

PATENT NO.     : 6,506,300 B2
DATED          : January 14, 2003
INVENTOR(S)    : Knut Kuss, Karl-Heinz Pischke and Mohammad-Saeed Ajam It is certified that error appears in the above-identified patent and that said Letters Patent is hereby corrected as shown below:

<u>Title page,</u>
Item [75], the listing of inventors should be as follows:

-- [75]  Knut Kuss, Nidderau (DE);
        Karl-Heinz Pischke, Gottingen (DE);
        Mohammad-Saeed Ajam, Dortmund (DE) --.

Signed and Sealed this

Seventeenth Day of June, 2003

JAMES E. ROGAN
*Director of the United States Patent and Trademark Office*